Sept. 16, 1969　　　　W. T. TERRELL　　　　3,467,812
IGNITER-THERMISTOR ASSEMBLY

Filed March 29, 1967　　　　　　　　　　2 Sheets-Sheet 1

INVENTOR.
WILLIAM T. TERRELL
BY
K. W. Brownell

INVENTOR.
WILLIAM T. TERRELL

United States Patent Office 3,467,812
Patented Sept. 16, 1969

3,467,812
IGNITER-THERMISTOR ASSEMBLY
William T. Terrell, Youngstown, N.Y., assignor to The Carborundum Company, Niagara Falls, N.Y., a corporation of Delaware
Filed Mar. 29, 1967, Ser. No. 626,745
Int. Cl. F23q 7/00
U.S. Cl. 219—264                    12 Claims

ABSTRACT OF THE DISCLOSURE

An igniter-thermistor assembly comprising an igniter having a hollow resistance body with a support tube secured therein. A thermistor, having a negative temperature coefficient, responsive to the igniter when energized is mounted within the support tube.

This invention relates to electrical resistance bodies, and more particularly to igniter-thermistor assemblies formed as a unitary or integral unit.

In the field of fuel burning or combustion systems it has been known to employ silicon carbide igniters because of their ability to withstand exceedingly high operating temperatures without disintegration or material deterioration. Furthermore, they are noncorrosive and substantially inert to the destructive effects of fuel combustion products.

The use of resistance igniters in combustion equipment generally requires a temperature sensor to determine that the igniter is operable before releasing fuel into the combustion chamber. The temperature sensor is very often a thermistor, which, as the term is employed herein, is an electrical resistance body having a high sensitivity to changes in temperature over a wide temperature range. The electrical resistance of a thermistor is sensitive to change with changes in temperature. Thermistors which decrease in resistivity with increase in temperature are said to have a negative temperature coefficient of resistivity.

These thermistors or sensors are normally mounted in close proximity to the ignitor for optimum response and require the usual encapsulation necessary to protect the sensor against mechanical damage or atmospheric conditions. Separate mounting arrangements are required for the igniter and the sensor. Igniter-sensor orientation and spatial relationships in mounting for optimum response are normally determined by trial and error experimentation in new equipment designs.

The general purpose of the present invention is to obviate the above disadvantages of prior-known igniter-sensor arrangements by providing an igniter of hollow tubular construction and mounting a thermistor as an integral element within the hollow core of the igniter. Thus, the integrated package, hereinafter more fully described, locates the sensor or thermistor for optimum response and the heater core itself provides the necessary protection for the sensor body. Accordingly, separate mounting devices are eliminated as well as the need for separate means for encapsulating the thermistor.

It is therefore an object of the present invention to provide a new and improved igniter-thermistor assembly.

It is another object of the present invention to provide a new and improved igniter-thermistor assembly which orients the thermistor relative to the igniter for optimum response.

It is a further object of the present invention to provide a new and improved igniter-thermistor assembly in which the thermistor is mounted within the hollow core of the igniter.

These and other objects of the present invention will become more apparent upon consideration of the following detailed description thereof when taken in conjunction with the following drawings, in which.

Figure 1:
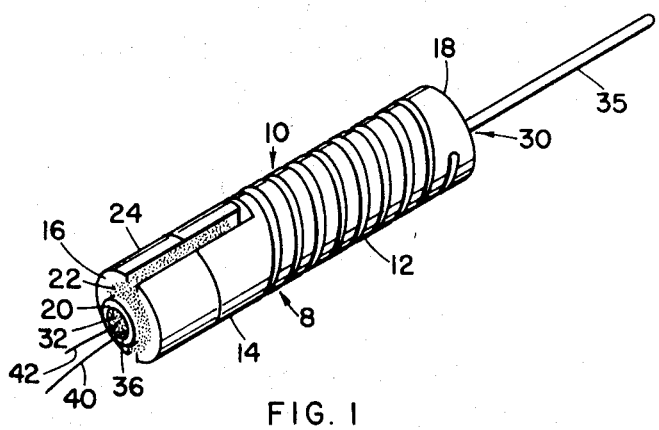
FIG. 1 is a perspective view of the igniter-thermistor assembly constructed in accordance with the principles of this invention.
Figure 2:
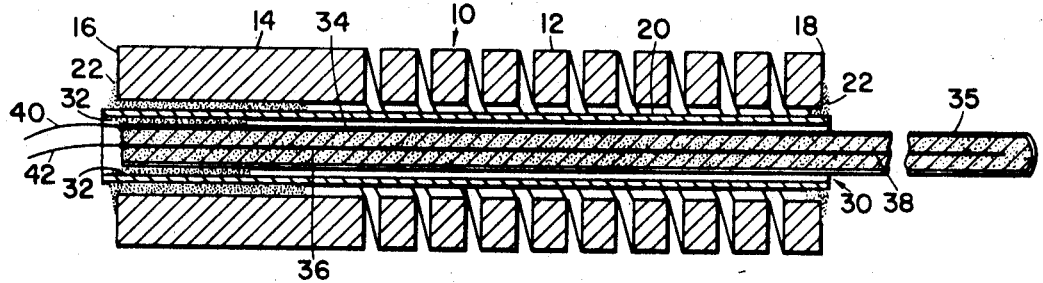
FIG. 2 is a longitudinal section of the igniter-thermistor assembly shown in FIG. 1.

Referring to FIG. 1 of the drawings, it will be seen that an igniter-thermistor assembly constructed in accordance with the preferred embodiment of the principles of this invention comprises an igniter, generally designated 8, having an elongated, hollow, tubular resistance body, generally designated 10, comprising a "hot zone" section 12 of a double spiral configuration, a cold end terminal section 14 and end portions 16 and 18, respectively. Resistance body 10 is preferably composed of a nonmetallic resistance material, such as very dense, high purity, self-bonded silicon carbide.

For the purpose of physically strengthening the resistance body 10, a high temperature, ceramic support tube 20, composed of a material such as alumina or mullite by way of example, is provided within resistance body 10 and extends substantially the length of said resistance body. Support tube 20 is secured at either end thereof to the body 10 by means of an adhesive material 22, preferably of a suitable ceramic cement having a high dielectric strength.

A coating of any suitable electrical conducting material 24, such as aluminum by way of example, is deposited on the exterior surface of the cold end terminal section 14 adjacent end portion 16 in order to provide terminals for the resistance body 10. End portion 16 is adapted to be mounted in a split clip type of electrical contact or any other suitable kind of electrical contact.

A thermistor, generally designated 30, having a negative temperature coefficient of resistivity, is mounted within support tube 20 and secured thereto adjacent end portion 16 by a suitable ceramic cement 32 having a high dielectric strength. The thermistor 30 comprises an electrically conductive metallic tubular sheathing or casing 34 having an end portion 35 protruding beyond end portion 18 of resistance body 10, said casing being filled with a suitable thermistor material 36. Embedded in the thermistor material 36 and extending substantially the length of casing 34 is an electrically conductive lead 38. Casing 34 serves as the other lead. Suitable electrical condustors 40 and 42 are attached to the ends of casing 34 and lead 36, respectively, and are provided with suitable insulated sheathings.

In use, resistance body 10 of the igniter-thermistor assembly is energized for heating the same, which in turn heats the thermistor. When the thermistor becomes sufficiently hot to decrease its resistance down to a predetermined range, current passes freely to actuate a relay for closing the circuit to the fuel valve which introduces fuel into a combustion chamber. It should also be understood that the thermistor can energize the gas valve directly when valve load is low enough to work properly with the thermistor. The fuel is ignited by the igniter element.

Figure 3:
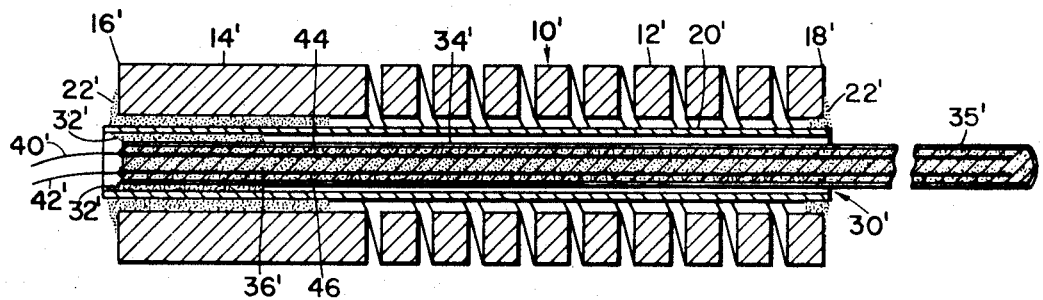
FIG. 3 is a view similar to FIG. 2 illustrating a second embodiment of the igniter-thermistor assembly of this invention.

FIG. 3 illustrates another embodiment of the igniter-thermistor assembly of this invention which is very similar to the above-described embodiment with the exception that rather than employing the casing as one electrical conductive lead, two separate leads are contained within the casing. All of the other structural features and their resultant functions are duplicated in the embodiment of FIG. 3 and the same reference characters primed are used to identify elements which are similar to those used in the first embodiment. As shown in FIG. 3, electrical conductive leads 44 and 46 are embedded in a suitable thermistor material 36' contained within casing 34'. An advantage residing in this second embodiment over the first is that the casing 34' per se is at zero electrical potential whenever the thermistor is cool, thus presenting no electrical shock hazard. The case becomes electrically charged only when the thermistor is exposed to heat.

In both of the above-described embodiments it should be appreciated that the principles of this invention contemplate the use of thermistors having any desired lengths, i.e. the end of the thermistor may or may not protrude beyond the end portion 18 of the igniter element, as desired.

Figure 4:
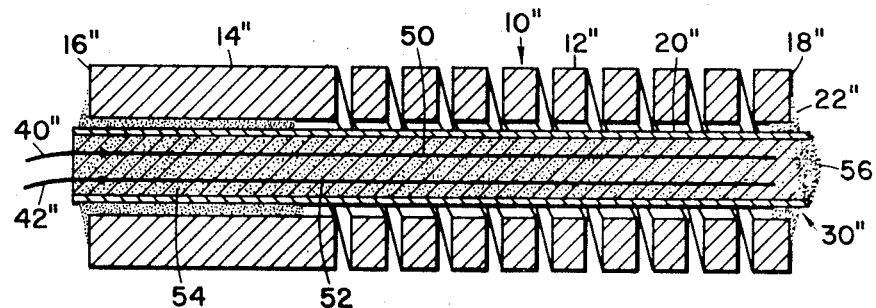
FIG. 4 is a longitudinal section illustrating a third embodiment of the igniter-thermistor assembly of this invention.

A third embodiment of the igniter-thermistor assembly is shown in FIG. 4. The reference numerals double primed indicate parts similar to those employed in the first embodiment. The igniter-thermistor assembly of FIG. 4 comprises an igniter having a resistance body 10" and a ceramic support tube 20" similar to the resistance body and support tube of the first embodiment described. A pair of electrical conductive leads 50 and 52 are positioned within support tube 20" and embedded in a suitable thermistor material 54 which is packed within support tube 20" and surrounds said conductive leads 50 and 52. A closure or plug 56, composed of a suitable ceramic cement, seals off the end of support tube 20". It will be noted that a metallic casing is not utilized in this embodiment and that support tube 20" serves as the casing. Thus, an advantage residing in this embodiment is that the problem of oxidation, which might occur with a metallic shrouded thermistor encircled by a heated igniter, is obviated and the useful life of the igniter-thermistor assembly is prolonged.

Figure 5:
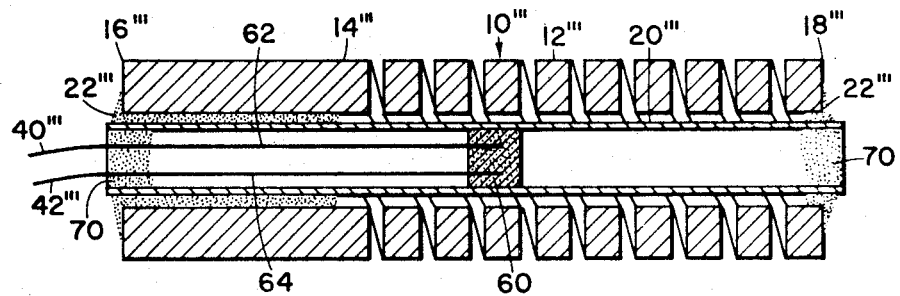
FIG. 5 is a longitudinal section of still another embodiment of the igniter-thermistor assembly of the present invention.

A fourth embodiment of the igniter-thermistor assembly is shown in FIG. 5. The reference numerals triple primed indicate parts similar to those employed in the first embodiment. The ingniter-thermistor asembly of FIG. 5 comprises an igniter having a resistance body 10''' and a ceramic support tube 20''' similar to the resistance body and support tube of the first embodiment described. A thermistor element 60, in the form of a pellet, fits snugly within support tube 20''' and has a pair of electrical conductive leads 62 and 64 embedded therein and extending therefrom. A suitable ceramic cement 70 is provided to seal off both ends of support tube 20'''. It will be seen that the cement mix encapsulates portions of leads 62 and 64 and serves to position and secure them in place.

In all four of the embodiments described above the thermistor is of the type having a negative temperature coefficient of resistivity.

As a result of the present invention, an improved igniter-thermistor assembly is provided in which a thermistor is mounted within the hollow core of an igniter element for spatially orienting said thermistor relative to the igniter for optimum thermal response. Moreover, the igniter serves as a shroud to shield the thermistor against atmospheric conditions and mechanical damage. Also, installation designs are simplified since less hardware is required for mounting the integrated assembly.

Preferred embodiments of this invention having been described and illustrated, it is to be realized that modifications thereof may be made without departing from the broad spirit and scope of this invention as defined in the appended claims.

I claim:
1. An igniter-thermistor assembly comprising: an igniter having an elongated hollow resistance body, said body having outer surface portions coated with an electrical conducting material forming terminals thereon; a support tube suitably secured within said resistance body; means for electrically insulating said tube from said resistance body; a thermistor mounted within said support tube; a pair of electrical leads connected to said thermistor; and means for electrically insulating said thermistor from said tube.

2. An igniter-thermistor assembly as defined in claim 1 in which said thermistor has a negative temperature coefficient and includes a thermistor material and in which at least a portion of one of said pair of leads is embedded in said thermistor material.

3. An igniter-thermistor assembly as defined in claim 2 in which said thermistor is provided with an elongated metallic casing enclosing said thermistor material and having an end portion extending axially beyond said support tube and said resistance body.

4. An igniter-thermistor assembly as defined in claim 3 in which said metallic casing serves as one of the electrical conductive leads.

5. An igniter-thermistor assembly as defined in claim 2 wherein said support tube is secured adjacent the opposite ends thereof to said hollow body with a ceramic cement.

6. An igniter-thermistor assembly as defined in claim 2 wherein said hollow body comprises a first portion having a pair of laterally spaced elongated members and a second portion having a double spiral configuration connected to and extending longitudinally from said elongated members.

7. An igniter-thermistor assembly as defined in claim 6 in which the ends of said elongated members remote from said second portion are coated with an electrical conducting material and engageable with an electrical contact.

8. An igniter-thermistor assembly comprising: an igniter having an elongated hollow resistance body, said body having outer surface portions coated with an electrical conducting material forming terminals thereon; a supporting tube suitably secured within said resistance body; means for electrically insulating said tube from said resistance body; a thermistor mounted within said tance body; and a pair of electrical leads connected to said thermistor.

9. An igniter-thermistor assembly as defined in claim 8 in which said thermistor has a negative termperature coefficient and includes a thermistor material and in which at least a portion of one of said pair of leads is embedded in said thermistor material.

10. An igniter-thermistor assembly as defined in claim 9 in which said support tube is ceramic, is provided with a plug at one end thereof, and contains said thermistor material.

11. An igniter-thermistor assembly as defined in claim 10 in which said thermistor material is in the form of a pellet.

12. A igniter-thermistor assembly as defined in claim 11 in which said support tube is provided with a plug at each end thereof and said leads have portions encapsulated and positioned by one of said plugs.

References Cited
UNITED STATES PATENTS

| | | | |
|---|---|---|---|
| 2,160,823 | 6/1939 | Black | 175—320 |
| 2,253,577 | 8/1941 | Pearson et al. | 338—23 |
| 2,546,415 | 3/1951 | Alcock | 60—233 |
| 2,549,633 | 4/1951 | Ottmar | 431—66 X |
| 3,142,479 | 7/1964 | Bartlett et al. | 431—66 X |
| 3,339,164 | 8/1967 | Landis et al. | 338—22 |
| 3,372,305 | 3/1968 | Miculec | 317—98 |

VOLODYMYR Y. MAYEWSKY, Primary Examiner

U.S. Cl. X.R.

123—143; 317—98; 338—22; 340—228